(12) United States Patent
Itou

(10) Patent No.: US 7,554,233 B2
(45) Date of Patent: Jun. 30, 2009

(54) ON-VEHICLE ALTERNATOR CAPABLE OF ADJUSTABLY ORIENTING OUTPUT CABLE

(75) Inventor: Yuuji Itou, Hekinan (JP)

(73) Assignee: Denso Corporation, Kariya (JP)

( * ) Notice: Subject to any disclaimer, the term of this patent is extended or adjusted under 35 U.S.C. 154(b) by 341 days.

(21) Appl. No.: 11/399,498

(22) Filed: Apr. 7, 2006

(65) Prior Publication Data

US 2006/0250035 A1 Nov. 9, 2006

(30) Foreign Application Priority Data

Apr. 7, 2005 (JP) ............................. 2005-110838

(51) Int. Cl.
*H02K 11/00* (2006.01)
(52) U.S. Cl. .............................. 310/71; 290/38 R; 74/6
(58) Field of Classification Search .................. 310/71, 310/68 D, 89; 290/38 R, 38 A; 74/6
See application file for complete search history.

(56) References Cited

U.S. PATENT DOCUMENTS 5,229,675 A 7/1993 Gotoh 6,563,241 B2 5/2003 Hayashi et al.

FOREIGN PATENT DOCUMENTS

| JP | A 5-22891 | 1/1993 |
|---|---|---|
| JP | A 2002-10568 | 1/2002 |

*Primary Examiner*—Javaid Nasri
(74) *Attorney, Agent, or Firm*—Oliff & Berridge, PLC

(57) ABSTRACT

An alternator (AC generator), which is to be attached to an engine mounted to a vehicle, comprises an output terminal to which one end of a cable for supplying a battery with power generated by the alternator is coupled. The battery is mounted on the vehicle. The alternator further comprises an insulator, a guide, and a direction setting member. The insulator, made from an electric insulative material, is for protecting the output terminal. The guide guides the cable along a desired direction from the output terminal. The direction setting member enables the guide to selectively set a direction among a plurality of predetermined directions along which the cable is allowed to be guided.

4 Claims, 6 Drawing Sheets

ON-VEHICLE ALTERNATOR CAPABLE OF ADJUSTABLY ORIENTING OUTPUT CABLE

CROSS-REFERENCE TO RELATED APPLICATION

This application is based on and claims the benefit of priority from earlier Japanese Patent Application No. 2005-110838 filed on Apr. 7, 2005, the description of which is incorporated herein by reference.

BACKGROUND OF THE INVENTION

1. Technical Field of the Invention

The present invention relates to an alternator (on-vehicle AC generator) which is mounted on an engine installed in a vehicle, and in particular, to an alternator equipped with a mechanism for setting a wiring direction of a cable to supply power to be outputted by the alternator.

2. Related Art

Most of engine-driven vehicles are generally equipped with alternators (on-vehicle AC generators), which generate power using the rotation of the engines. The alternator has a cable (output cable) connected to an on-vehicle battery and other necessary accessories, so that the alternator provides the power via the cable.

Such a structure for wiring the cable is disclosed for example by Japanese. Unexamined Patent Application Publication No. 2002-010568. In the structure of this publication, an insulator for insulating and protecting an output terminal of an alternator has been positioned by providing a main unit of the alternator with an engaging portion to establish a whirl-stop mechanism for the insulator. This positioning has prevented the insulator from rotating about an axis of the output terminal when nuts for fixing the insulator and vehicle side nuts for fixing the output terminal are tightened for fixation of the insulator.

The positioning in the conventional positioning structure, however, has limited the number of directions of an insulator to only one.

Generally, a vehicle side cable is run differently depending on individual vehicles. Insulators having directivity, i.e. having guides for determining directions for leading (wiring) cables, and having an identical shape have thus suffered from having to be newly constructed to set the guides at proper positions for the different leading directions as required by the respective vehicles.

SUMMARY OF THE INVENTION

The present invention has been made in view of the problem described above, and has an object of providing an alternator with which a cable can be wired to different directions without the necessity of newly producing an insulator.

As one aspect of the present invention, there is provided an alternator to be attached to an engine mounted to a vehicle, comprising: an output terminal to which one end of a cable for supplying a battery with power generated by the alternator is coupled, the battery being mounted on the vehicle; an insulator, made from an electric insulative material, for protecting the output terminal; a guide guiding the cable along a desired direction from the output terminal; and a direction setting member enabling the guide to selectively set a direction among a plurality of predetermined directions along which the cable is allowed to be guided.

Since the alternator of the present invention can cope with a plurality of directions for wiring (leading) a cable through the guide, a new insulator does not have to be built every time a different leading direction is demanded. Thus the one type of insulator is enough for different vehicles, so that the insulator can be enhanced in versatility.

By way of example, the direction setting member include engaging portions which enable both the insulator and a component fixed in the Alternator to be engaged with each other in a condition where the direction is selectively set.

In the alternator of the present invention, the recesses and projections of the engaging portion of the alternator and the insulator, respectively, enable mounting of the insulator at any desired engageable position so as to cope with a plurality of directions for leading a cable through the guide. At the same time, the insulator can be prevented from rotating about an axis of the vehicle side output terminal when nuts for fixing the insulator and nuts for fixing the output terminal are tightened for fixation of the insulator.

DETAILED DESCRIPTION OF THE PREFERRED EMBODIMENTS

Hereinafter is described in detail an embodiment of an alternator (i.e., on-vehicle AC generator) to which the present invention has been applied, with reference to the accompanying drawings.

Figure 1:
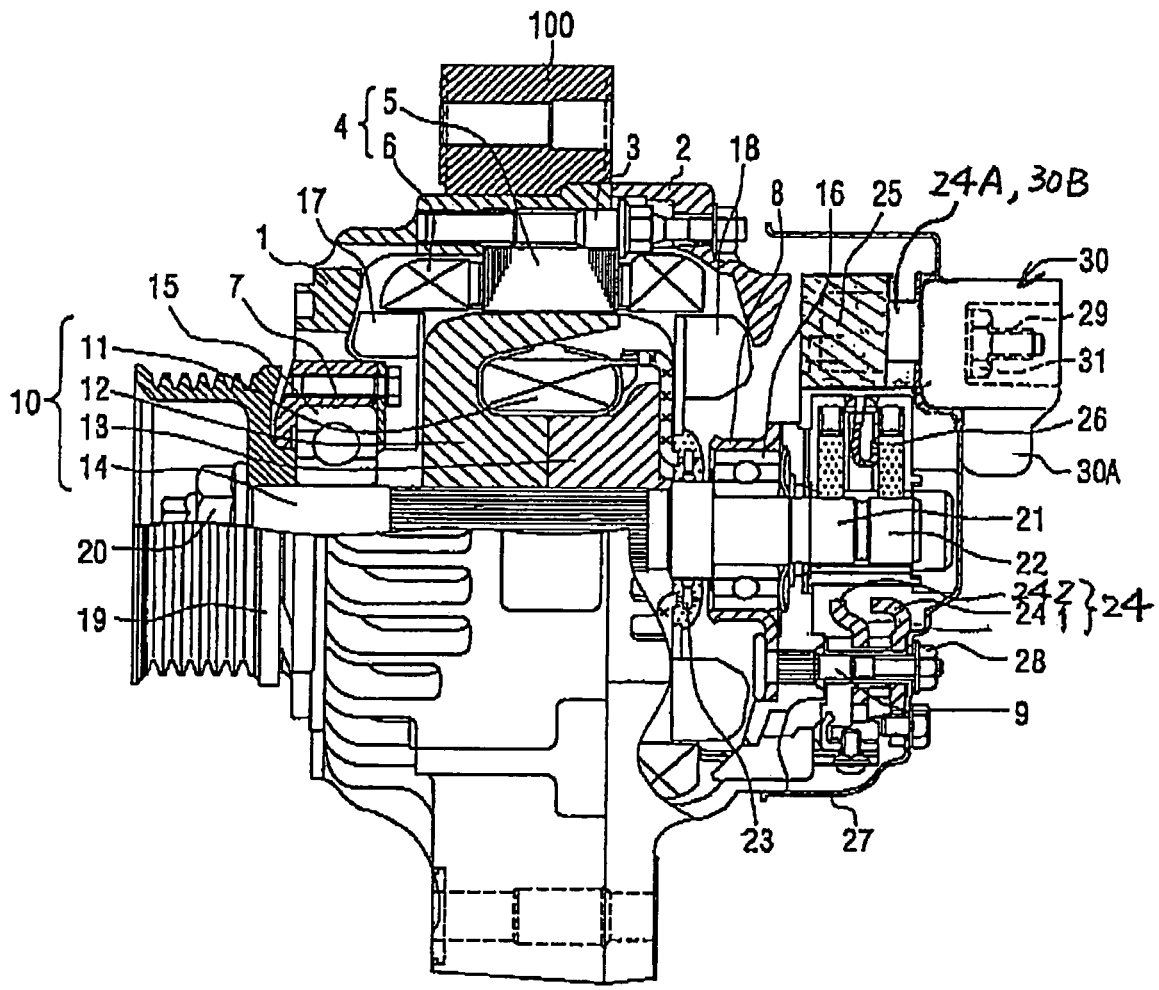
FIG. 1 is a partly broken cross section showing the structure of an alternator (on-vehicle AC generator) according to an embodiment of the present invention.
Figure 2:
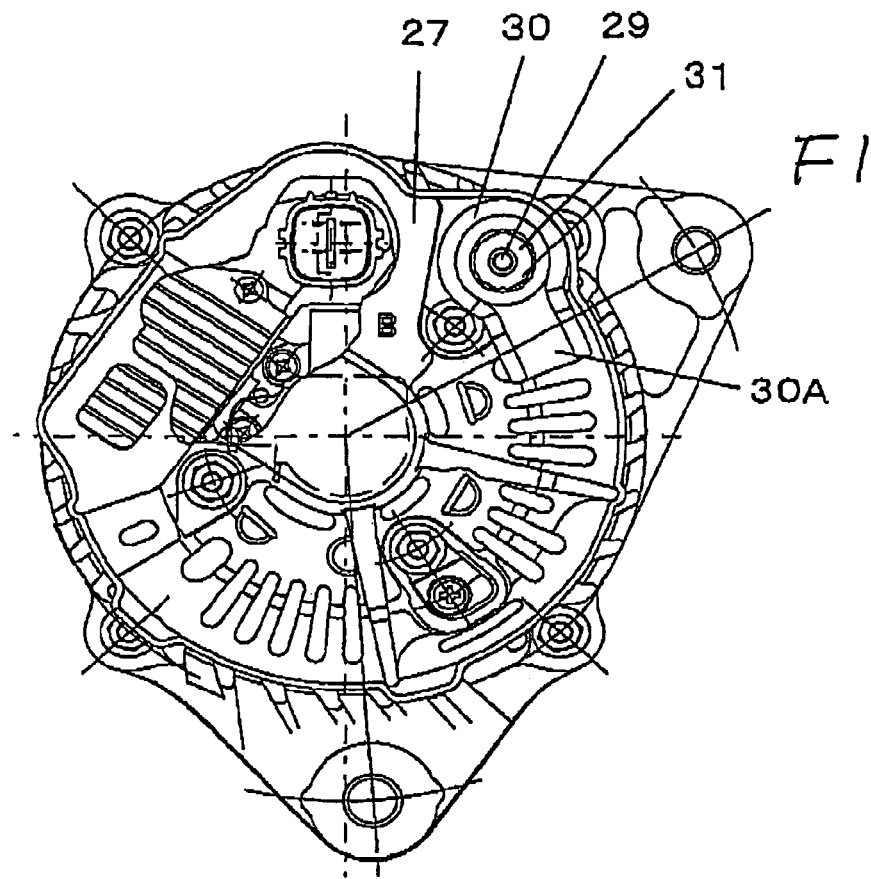
FIG. 2 is a side elevation of the alternator according to the embodiment, as viewed from a rear cover thereof.

FIGS. 1 and 2 each show a general configuration of the alternator according to the embodiment.

An alternator 100 includes a front housing 1, a rear housing 2, a stator 4, a rotor 10, a rectifying device 24, a voltage control unit 25, a brush device 26, and a cover 27.

Both of the front housing 1 and the rear housing 2 have a bowl-shaped form, and are linked and fixed together through a plurality of bolts 3 with their opening portions being in direct contact with each other. The stator 4 is fixed to an inner periphery of the front housing 1. A cylindrical bearing box 7 is integrated into the front housing 1, and an iron bearing box 8 is attached to the rear housing 2 through a bolt 9 having a knurl.

The stator 4 includes a stator iron core 5 and a stator coil 6.

The rotor 10 includes a field magnet coil 11, pole cores 12, 13 and a shaft 14, and is rotatably held by a pair of bearings 15, 16 which are fixed to the bearing boxes 7, 8, respectively. Centrifugal cooling fans 17, 18 are attached to axial end faces of the pole cores 12, 13, respectively. The front side cooling fan 17 is a mixed flow type fan with its blades being inclined forward with respect to the rotational direction of the rotor 10 so as to produce cooling air toward the field magnet coil 11. A pulley 19 is coupled to a front end of the shaft 14 by means of a nut 20, and rotated and driven by a vehicle engine, not shown. A pair of slip rings 21, 22 is provided at a rear end of the shaft 14 extending out of the rear housing 2, and is electrically connected to the field magnet coil 11 through a conductor 23.

So-called electrical components, such as the rectifying device 24, the voltage control unit 25 and the brush device 26 are fixed to an outer axial end face of the rear housing 2, by using fixing means, such as the bolt 9. The rectifying device 24 rectifies an output voltage of the three-phase stator coil 6, or a three-phase AC voltage, for example, for conversion into a DC output voltage. The voltage control unit 25 controls the output voltage of the alternator 100 by controlling an exciting current that flows through the field magnet coil 11. The brush device 26 is to flow the exciting current from the rectifying device 24 to the field magnet coil 11 of the rotor 10, with a suppression brush being provided to each of the slip rings 21, 22 formed at the shaft 14 of the rotor 10.

The cover 27, which is made of metal, covers and protects the electrical components, such as the rectifying device 24, the voltage control unit 25 and the brush device 26, which are attached to the outer face of the rear housing 2. The cover 27 is fixed to the bolt 9 extending from the rear housing 2 by tightening a nut 28, with the rectifying device 24 being clamped therebetween. The cover 27 has, in the vicinity of the brush device 26, a window for introducing cooling air.

In the alternator 100 having the configuration described above, when torque is transferred to the pulley 19 from the vehicle engine through a belt or the like, the rotor 10 rotates in a predetermined direction. In this state, with the application of the exciting voltage from outside onto the field magnet coil 11 of the rotor 10, a claw portion of each of the pole cores 12, 13 is excited to enable generation of a three-phase AC voltage in the stator coil 6, thereby taking out a predetermined DC current from a cylindrical output terminal 29 provided at the rectifying device 24.

A resin insulator 30 for insulating and protecting the output terminal 29 is engaged with and fixed to the alternator main unit GB by tightening a nut 31. The alternator main unit GB is defined as, of the alternator 100, a main body other than the insulator 30. It should be noted that the insulator 30 is integrally provided with a guide 30A for leading a cable CB (refer to FIG. 5) connected to the output terminal 29 to a predetermined direction.

Engaging portions of both the insulator 30 and the rectifying device 24 arranged in the alternator main unit GB will now be described.

Figure 4:
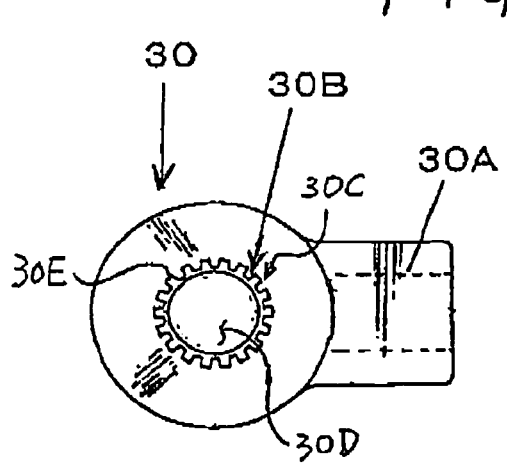
FIG. 4 is a side view showing an engaging portion of an insulator installed in the alternator according to the embodiment, the side view being viewed from a thickness direction of the insulator.
Figure 3:
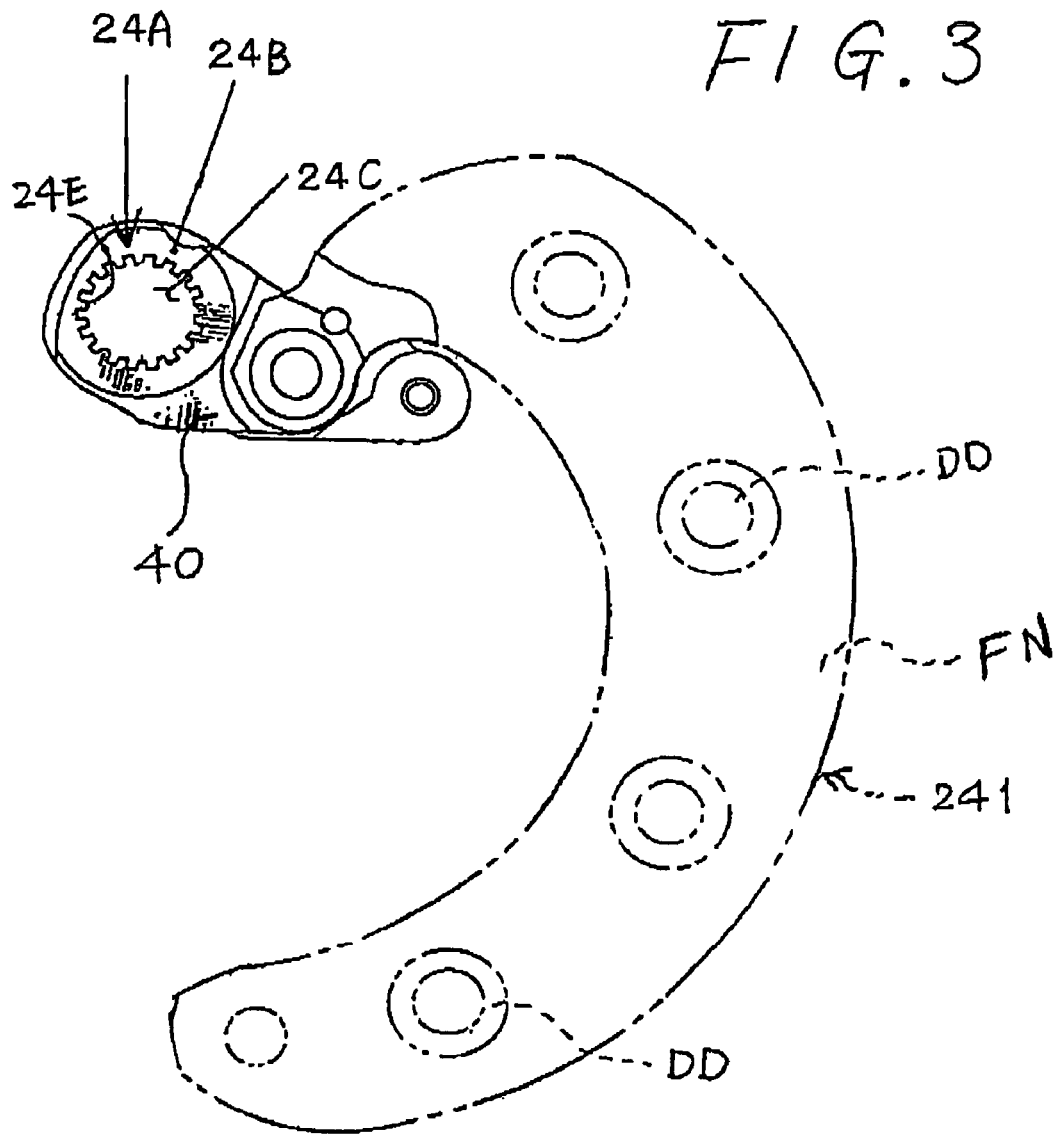
FIG. 3 is a side view showing an engaging portion of a first rectifier block composing part of a rectifying device installed in the alternator according the embodiment, the side view being viewed from a thickness direction of the block.
Figure 5:
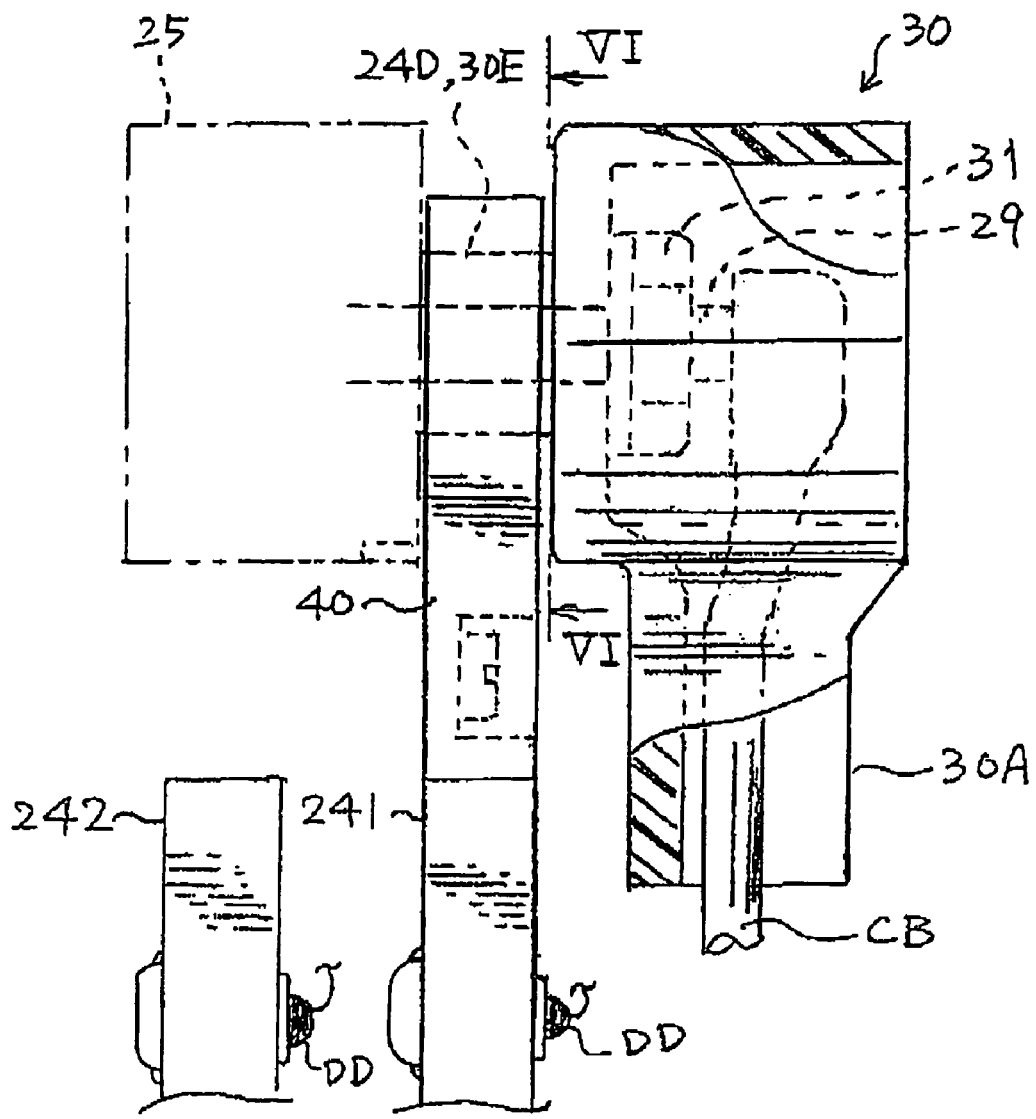
FIG. 5 is a side view explaining an assembly between the first rectifier block and the insulator.

As shown in FIGS. 3, 4 and 5, the rectifying device 24 is provided with a first and second rectifier blocks 241 and 242, each of which is formed into a substantially semi-annular plate and fixedly arranged around the shaft 14 in an approximately perpendicular attitude to the shaft 14. Each of the first and second rectifier blocks 241 and 242 is an approximately semi-annular plate-like radiator FN and a plurality of rectifiers DD, arranged on the radiator FN, which performs the foregoing rectifying function.

Of the first and second rectifying blocks 241 and 242, one rectifying block, which is the first rectifying block 241 positioned nearer to the outside in the axial direction of the shaft 14, has one end portion, which is extended by a plate-like, paddle-shaped extension member 40 in such a manner that the block 241 forms a unified single plate. In the present embodiment, the extension member 40 is part of the first rectifying block 241.

At one end of this extension member 40, a resin-made engaging portion 24A is formed on one wall surface in the thickness direction thereof, so as to serve as a rectifying-device-side engaging portion, where the portion 24A is almost plate-like and round-shape. A through-hole 24C with a predetermined radius is formed to pass through this engaging portion 24A such that there is left an annular circumferential portion 24B centered at a predetermined position at the engaging portion 24A. Along an inner circumferential surface of this engaging portion 24A, a protrusion-like portion (teeth) 24D consisting of recesses and protrusions arranged at intervals along the inner circumferential surface.

On the other hand, as shown in FIG. 4, the insulator 30 has the foregoing guide 30A united with the insulator 30 and formed to extend from a side wall which can be seen when being installed. In addition, on the bottom of the insulator 30, there is formed a resin-made engaging portion 30B on the outer surface of the bottom. Both the guide 30A and the engaging portion 30B are integrally formed with the main body of the insulator 30 to form the resin-made insulator 30. Alternatively, the guide 30A and engaging portion 30B may be formed as separate members, respectively, and then rigidly secured to the main body of the insulator 30.

The engaging portion 30B is formed to have a through-hole 30D whose radius is a predetermined value and whose center is located at the center of the bottom, such that there is left an approximately annular circumferential portion 30C. That is, through both the bottom of the inverter 30 and the engaging portion 30B, the through-hole 30D is formed to pass therethrough along the axial direction of the shaft 14. Along the outer circumferential surface of the circumferential portion 30C, a recess-like portion (teeth) 30E consisting of recesses and protrusions arranged at intervals along the circumferential direction. The recesses and protrusions are designed to be engageable with the recesses and protrusions (teeth) of the engaging portion 24A. placed on the foregoing first rectifier block 241.

Thus, to allow the output terminal 29 to be inserted through the bottom of the insulator 30, the recess-like portion 24D of the extension member 40 extended from the first rectifier block 241 is subjected to a coaxial insertion of the protrusion-like portion 30E of the insulator 30. During this inserting operation, an engaging angle between the recess-like portion 24D and the protrusion-like portion 30E can be s adjusted in such a manner that the angle of the output terminal 29 around the axial direction thereof, that is, the wiring direction of the output cable CB agrees with a desired wiring direction derived from a request on vehicle conditions.

Figure 6:
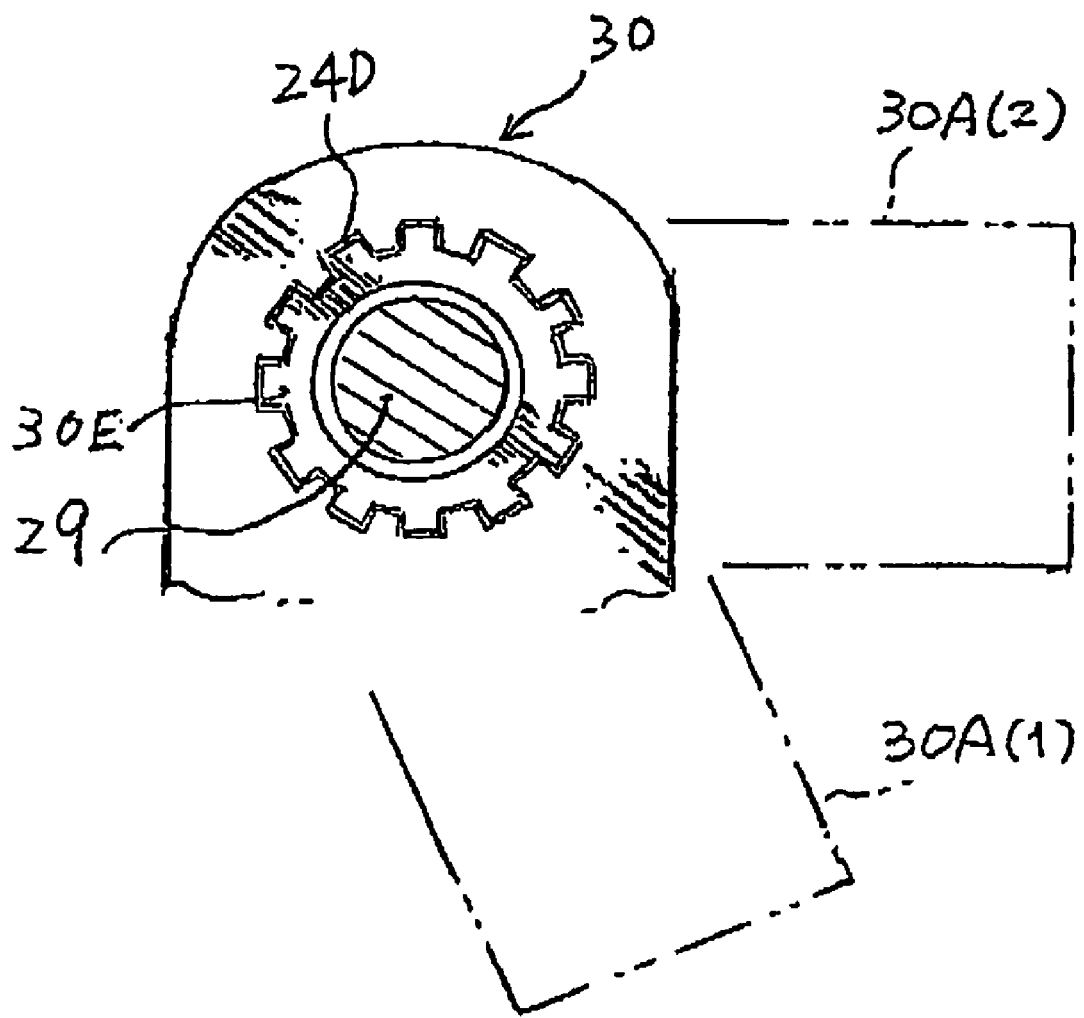
FIG. 6 is a side view taken along a VI-VI line in FIG. 5.

In this way, the recesses and protrusions of the recess-like portion 24D are arranged at equal pitches on the circumferential surface of the engaging portion 24A on the side of the rectifying device 24. Meanwhile the insulator 30 has the recesses and protrusions composing the protrusion-like portion 30E, which is engageable with the recess-like portion 24D. Hence as shown in FIGS. 5 and 6, the insulator 30 can be set at any engageable angular position in relation to the engaging portion 24, that is, the main body BD of the alternator, which makes it possible that the guide 30A of the insulator 30 can be oriented in a desired wiring direction depending on a request coming from vehicle design conditions.

In short, when the engaging portion 30B of the insulator 30 is made to be engaged with the engaging portion 24A of the rectifying device 24, the engaging angle (i.e., an angle around the axis of the output terminal 29) can be adjusted arbitrarily, with the result that the guide 30A can be located selectively at a desired angle in an angular range of 30A(1), 30A(2), . . . . This angular positioning can be executed selectively around 360 degrees, though it is at pitches. Accordingly, if the guide 30A is changed, i.e., the wiring direction from the output terminal 29 is changed, the insulator 30 of one type is still enough for different wiring directions of the cable CB, thus providing a higher so versatility to the insulator 30.

Further, while the engagement between the recess-like portion 24D and the protrusion-like portion 30E allows the insulator 30 to be fixed, the rotations around the output terminal 29, which occur during tightening of the nut 31, can also be avoided steadily.

Moreover, the recess-like portion 24D and protrusion-like portion 30E are engaged with each other at predetermined pitches over their circumferential directions. This provides high resistance against the foregoing tightening operation. Thus, even when the engaging portions 24A and 24B both are made of resin, like the foregoing embodiment, the portions can bear high tightening pressure.

Figure 7:
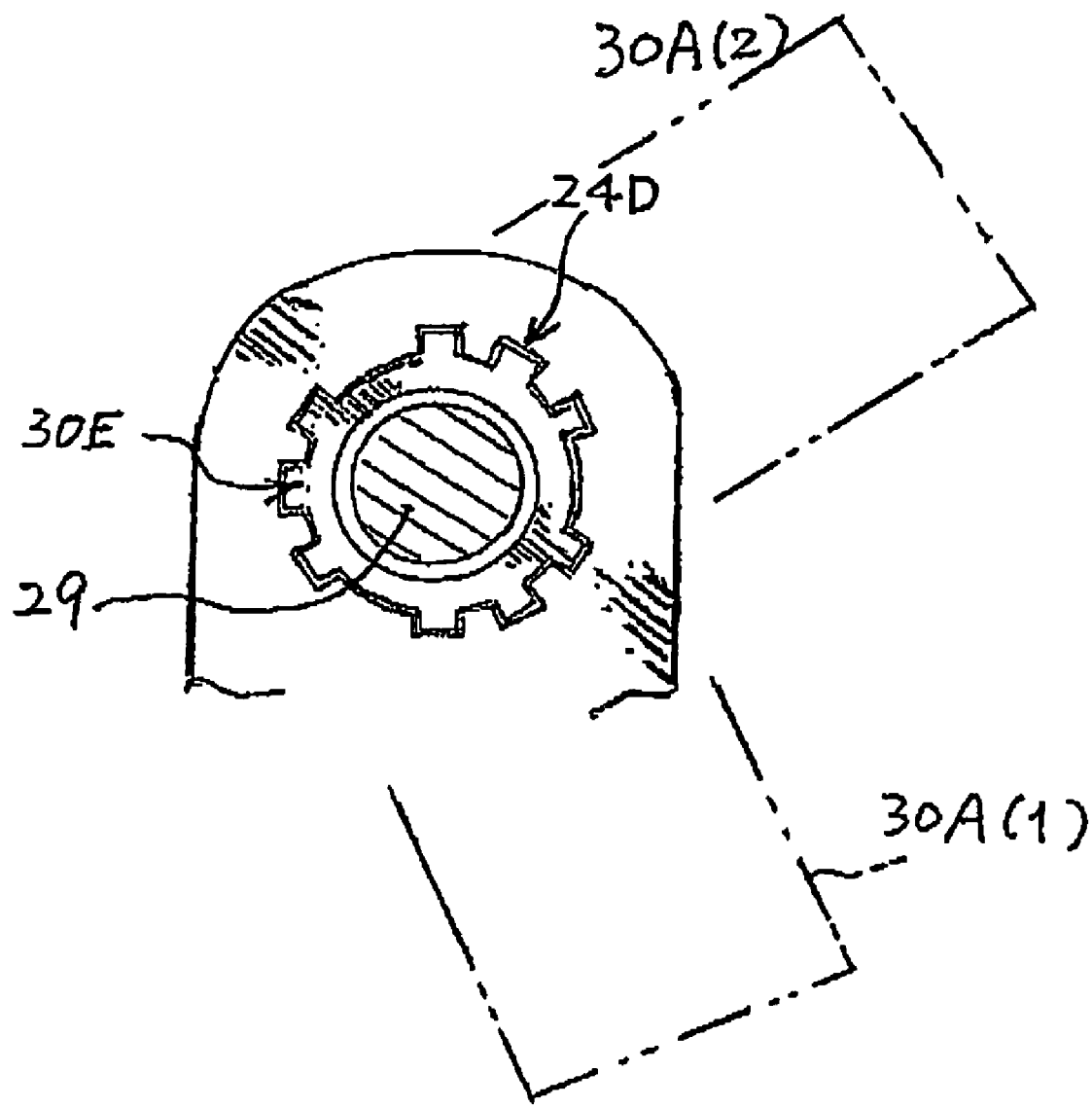
FIG. 7 is an illustration for engaging portions between a rectifier block and an insulator, which is according to a variation of the structure shown in FIG. 6.

The foregoing configurations may still be modified into various other forms. For example, though the foregoing embodiment provides the arrangement of both the recess-like portion 24D and the protrusion-like portion 30E which are arranged at equal intervals along each circumferential direction, this is not a decisive list. As long as the guide 30A may be set in different directions, the arrangement of both the recess like portion 24D and the protrusion-like portion 30E is not always limited to the equal intervals. By way of example, as shown in FIG. 7, those recess-like portion 24D and protrusion-like portion 30E can be localized in different plural regions along their circumferential directions, where one or more engaging teeth are formed region by region. It is therefore possible that options for the wiring direction are obtained depending on the number of regions each subjected to formation of the engaging teeth. Meanwhile, the shapes of the recess-like portion 24D and the protrusion-like portion 30E are not necessarily confined to rectangles in section. For example, those of the portions 24D and 30E may be triangular in section.

The present invention may be embodied in other specific forms without departing from the spirit or essential characteristics thereof. The present embodiment and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An alternator to be attached to an engine mounted to a vehicle, comprising:
    an output terminal to which one end of a cable for supplying a battery with power generated by the alternator is coupled, the battery being mounted on the vehicle;
    an insulator, made from an electric insulative material, for protecting the output terminal;
    a guide guiding the cable along a desired direction from the output terminal; and
    a direction setting member enabling the guide to selectively set a direction among a plurality of predetermined directions along which the cable is allowed to be guided,
    wherein the direction setting member includes engaging portions which enable both the insulator and a mechanical part of a rectifying device fixed in the alternator to be engaged with each other in a condition where the direction is selectively set, rectifiers being mounted on the mechanical part as a part of circuitry parts for supplying the power, and
    wherein the engaging portions are composed of a first engaging portion formed on the mechanical part of the rectifying device and a second engaging portion formed on the insulator and formed to be engageable with the first engaging portion, the first and second engaging portions being respectively formed to be engaged coaxially with each other and each of the first and second engaging portions having recesses and projections formed along a circumferential surface of each of the first and second engaging portions, the circumferential surfaces of the first and second engaging portions being opposed to each other.

2. The alternator according to claim 1, wherein the guide is united with the insulator and both the guide and the insulator are made of a resin material.

3. The alternator according to claim 1, wherein the output terminal provides an axial direction along a longitudinal direction of the output terminal and the plurality of predetermined directions are directions radiated along a plane perpendicular to an axial direction provided by the output terminal.

4. The alternator according claim 1 wherein the recesses and projections of the engaging portion of each of the first and second engaging portions are formed at constant pitches along the circumferential surface thereof.

* * * * *